United States Patent Office 2,796,321
Patented June 18, 1957

2,796,321
POLYCHLORIMIDOMETAPHOSPHATES

Maurice C. Taylor, Niagara Falls, N. Y.

No Drawing. Application June 16, 1953,
Serial No. 362,168

11 Claims. (Cl. 23—50)

The present invention relates to a new class of chloramines which may be called polychlorimidometaphosphates and to a method of preparing these compounds.

The polychlorimidometaphosphates form readily at room temperature by the reaction of an imidometaphosphate with a metallic hypochlorite or with hypochlorous acid. The resulting reaction product is a stable chloramine of the class of polychlorimidometaphosphates. The reaction products are readily soluble in water and in slightly alkaline solution they hydrolyze to generate hypochlorite ion and thus the compounds are of value for bleaching purposes, disinfecting purposes and generally as oxidizing and chlorinating agents.

The chloramines of the class polychlorimidometaphosphates are relatively stable in the dry state and contain relatively large quantities of available active chlorine in the neighborhood of 52%.

In the preparation of the chloramine of the class polychlorimidometaphosphates, the reaction of hypochlorous acid or metallic salt thereof, with a polyimidometaphosphate or polyimidometaphosphoric acid, is relatively complete over a relatively wide pH range. The reaction occurs even at a low pH of 2, or at a high pH of 10, with a preferable range between pH 4 and pH 9. The end product may be readily obtained by separation from the reaction environment, as for instance by fractional crystallization or by salting out or by the addition of an organic solvent, as for instance acetone or ethyl alcohol and may even be obtained as crude product by evaporating the reaction mass to dryness. Although the product may be produced and used as a variety of salts, as for instance a salt of an alkali metal or of an alkaline earth metal, including magnesium, it is preferably obtained as the sodium, potassium or lithium salt.

The polyimidometaphosphoric acids and the salts thereof, upon which the hypochlorite reacts to produce the class of polychlorimidometaphosphates of the present invention are readily formed, as is known, from the polyphosphonitrilic chlorides. These latter compounds are produced by the reaction of ammonium chloride and phosphorous pentachloride or by the chlorination of phosphorous nitrides. The phosphonitrilic chlorides exist in various polymeric forms, such as the trimer $P_3N_3Cl_6$, and the tetra $P_4N_4Cl_8$ and so forth, in accordance with the class formula $(PNCl_2)_n$ where $n$ is an integer. The lower members of this series are crystalline materials, while the higher members are oils at room temperature and some forms are of rubberlike consistency. Upon hydrolysis, these polymeric chlorides form acids which are capable of producing salts. Thus, the hydrolyzed products of the phosphonitrilic chlorides may be, depending upon the degree of hydrolysis, trisodium tri-imidometaphosphate $P_3N_3H_3Na_3O_6$, the tetra compound tetrasodium tetra-imidometaphosphate $P_4N_4H_4Na_4O_8$ and so forth, when the hydrolysis proceeds in a medium made alkaline with a sodium compound.

Upon the reaction of hypochlorite with a particular imidometaphosphate, a resultant product is produced containing available chlorine, the number of chlorine atoms being the same as the number of nitrogen atoms in the molecule when completely chlorinated. Thus a tri-imidometaphosphate sodium salt, $P_3N_3H_3Na_3O_6$, produces the corresponding trichlorimidometaphosphate of the formula $P_3N_3Cl_3Na_3O_6$. Partially chlorinated compounds may be produced by regulating the molar amounts of hypochlorite reacting upon the selected imidometaphosphate to produce a monochlor substituted, dichlor substituted compound or the like, depending upon the number of hydrogen present and the number to be replaced. The class formula for the chlorimidometaphosphates being

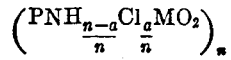

$$\left(\mathrm{PNH}_{\frac{n-a}{n}}\mathrm{Cl}_{\frac{a}{n}}\mathrm{MO}_2\right)_n$$

where M is a metal, $n$ an integer from 3 to 7 inclusive and $a$ an integer from 1 to $n$, indicates that the fully chlorinated polymeric forms possess subsequent identity of available chlorine and, therefore, the choice or selection of which of the polymeric compounds to employ will depend upon ease of isolation, ease of purification and stability of end product. In general, the trimer and tetramer sodium salt will be the products preferably employed.

The polychlorimidometaphosphates may be produced in dry form, in crystalline hydrated form, or as mixed crystals with other materials, such as potassium chloride or associated with small amounts of buffering agents which may be added to the solution or slurry before precipitation of the desired product with alcohol or before evaporation of the reaction product to dryness. Thus one may use materials which when placed in solution giving a pH of from, say 4 to 9, and preferably about 8, as for instance disodiumhydrogen phosphate, tetrasodium tetraborate, sodium bicarbonate, sodium tripolyphosphate and other well known buffering materials.

Since the products are hydrolyzed in water in slightly alkaline solutions to produce available chlorine, their stability is improved by thoroughly drying and maintaining the end products in the dry state. As the polychlorimidometaphosphates are relatively stable, they may be heated during the drying to, say, 50 to 70° C. while passing air through the powdered end product or by heating the end product to, say, 50 to 70° C. under reduced pressure of from 2 to 5 millimeters of mercury.

The products may also be dried by suspending them in a dry, non-aqueous solvent, which boils at a moderately elevated temperature, say of from 50 to 70° C. and then distilling off the major portion of the solvent thereby carrying off the last traces of water. The usual solvents employed in this form of drying, as for instance the halogenated hydrocarbons, are eminently suitable as, for instance, chloroform or the trichloroethanes and the like.

In their manufacture, it may not be necessary comply to dry the products but to produce materials which contain less than about 5% of water and fix the remaining small amount of water by the addition of dehydrating agents. Thus one may add dehydrated trisodiumphosphate, anhydrous trisodiumphosphate, anhydrous sodium carbonate and anhydrous lithium chloride, anhydrous sodium hydroxide, or the corresponding potassium compounds. Or, one may add sodium monoxide in an amount not exceeding that which is chemically equivalent to the water present, or merely a very slight excess.

Where it is desired to purify the polychlorimidometaphosphate, as for instance the sodium salts of the trimer, the tetramer or other polymeric form, this may be done by extraction with glacial acetic acid and subsequently washing the cake with ethyl alcohol.

While the exact constitutional formula of the compounds of the present invention is not known at this time with certainty, it is believed that Formula 1

(1) 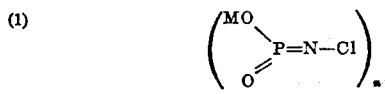

(2) 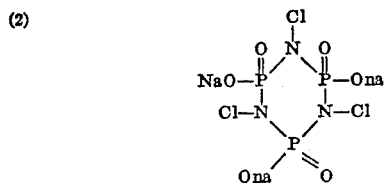

represents the fully chlorinated products described herein, where M is a monovalent metallic radical and where $n$ is an integer with a value of 3 to 7 and (2) a lactam structure for the trimer.

The following examples are given merely as illustrative and are not deemed to be limitative of the invention.

*Example 1*

A sodium hypochlorite solution containing 0.294 gm. of available chlorine per ml. was made by dissolving the pentahydrate of sodium hypochlorite in water. 23 ml. of this solution were placed in a glass cup mounted in an ice bath and provided with a stirrer. Then 12 gm. of trisodium tri-imidometaphosphate containing 11% nitrogen were added gradually over a three minute period. 18 ml. of a solution of acetic acid containing .39 gm. of acid per ml. were added dropwise over a 45 minute period. The temperature throughout the operation remained between 12 and 18 degress C. One gm. of triosodium phosphate was added to the reaction product. Then 130 ml. of 97% ethyl alcohol were added to precipitate the product as a white powder which was filtered off and dried in a vacuum desiccator. The dry powder contained 42% available chlorine. The available chlorine yield was 97%.

The product obtained by precipitation with alcohol was dissolved in sufficient water to produce a saturated solution at 40° C. and cooled to 15° C. to form the pure dihydrate of trisodium trichlorimidometaphosphate, $P_3N_3Cl_3Na_3O_6 \cdot 2H_2O$. These crystals appears as flat plates in the shape of a parallelogram having an acute angle of 69° and an extinction position between crossed Nicol prisms at 40° to the long side of the parallelogram. The dihydrate was filtered off, washed and dried at 50° C. and 2 mm. pressure to produce trisodium trichloroimidometaphosphate with analysis as follows:

|  | Found | On Dry Basis | Theory for $P_3N_3Cl_3Na_3O_6$ |
| --- | --- | --- | --- |
| Available chlorine | 48.1 | 50.2 | 52.4 |
| Active chlorine | 24.1 | 25.1 | 26.2 |
| Total chlorine | 24.4 | 25.4 | 26.2 |
| Nitrogen | 9.7 | 10.1 | 10.3 |
| Phosphorus | 21.9 | 22.8 | 22.9 |
| Water | 4.1 | 0.0 | 0.0 |

*Example 2*

27.5 ml. of a sodium hypochlorite solution made from the pentahydrate of sodium hypochlorite and containing .274 gm. available chlorine per ml. were placed in a glass cup as in Example 1; 20 ml. of water were added. Then 12.5 gm. of tetrasodium tetraimidomethaphosphate containing 12.1% nitrogen were added gradually with stirring. 24.8 ml. of an acetic acid solution containing .30 gm. of acid per ml. were added slowly. Two drops of 30% sodium hydroxide solution and .3 gm. of trisodium phosphate were added. The temperature throughout was 14 to 18° C. Then the product was precipitated with three volumes of dry ethyl alcohol and filtered. The product was dried at 55 to 60° C. and a pressure of 5 to 10 mm. 14.9 gm. of product were obtained containing 45.4% available chlorine. The available chlorine yield was 90%. This product was further dried by suspending 14.9 gm. in 200 ml. of dry chloroform and distilling off 150 ml. of chloroform at atmospheric pressure. The remaining slurry was filtered and the solid product heated in vacuum at 55 to 60° C. until the chloroform was removed. 14.2 gm. of product were obtained containing 47.6% available chlorine.

The product obtained by precipitation with alcohol was dissolved in water to make a saturated solution at 40° C. and cooled to 20° C. whereupon a large yield of the nine hydrate of tetrasodium tetrachlorimidometaphosphate was obtained—$P_4N_4Cl_4Na_4O_8 \cdot 9H_2O$. These crystals appear as flat plates in the shape of a parallelogram with acute angle of 75° and an extinction parallel to the long side of the parallelogram.

A concentrated solution of the product obtained by precipitation with alcohol was placed over concentrated sulfuric acid and slow evaporation allowed to occur. A yield of the fourteen hydrate of tetrasodium tetrachlorimidometaphosphate was obtained. These crystals commonly appear as flat plates in the shape of a parallelogram with an acute angle of 81° and an extinction position at 72° to the long side of the parallelogram.

A solution saturated at 30° C. with the product obtained by the precipitation with alcohol was quickly cooled to 10° C. whereupon a yield of the 25 hydrate of ($P_4N_4Cl_4Na_4O_8 \cdot 25H_2O$.) tetrasodium tetrachlorimidometaphosphate was obtained. These crystals are long, needle-like prisms with parallel extinction.

Any of the hydrates of the tetrasodium tetrachlorimidometaphosphate may be dried. For example, the nine hydrate was dried at 60° C. and 2 mm. pressure to yield tetrasodium tetrachlorimidometaphosphate having the following composition:

|  | Found | Dry Basis | Theory for $P_4N_4Cl_4Na_4O_8$ |
| --- | --- | --- | --- |
| Available chlorine | 49.5 | 50.4 | 52.4 |
| Active chlorine | 24.8 | 25.2 | 26.2 |
| Total chlorine | 24.9 | 25.3 | 26.2 |
| Nitrogen | 10.0 | 10.2 | 10.3 |
| Phosphorus | 22.5 | 22.9 | 22.9 |
| Water | 1.7 | 0.0 | 0.0 |

*Example 3*

30% sodium hydroxide solution was chlorinated at 15 to 20° C. until it contained .211 gm. of available chlorine and .012 gm. of sodium hydroxide per ml. 16.5 ml. of this solution were placed in a cup in an ice bath. 5.0 gm. of tetrasodium tetraimidometaphosphate containing 13.4% nitrogen were added. After 2 or 3 minutes standing, the dropwise addition of 10% hydrochloric acid was begun. After 4.4 ml. had been added the solution was acid (yellow) to thymol blue. Then .1 gm. of trisodium phosphate was added. The product was precipitated with 3 volumes of dry ethyl alcohol and filtered after standing 10 minutes at room temperature. The cake was dried in vacuum at 60° C. The dried product weighed 9.8 gm. and contained 27.7% available chlorine. It was further dried by distilling with chloroform to produce a product containing 29.2% available chlorine. The available chlorine efficiency was 81%.

*Example 4*

Polysodium polyimidometaphosphate was prepared by hydrolyzing a fraction of nitrilic chloride boiling between 200 and 270° C. at 13 mm. pressure. The hydrolysis was done by mixing 22.9 gm. of the fraction with 28.6 gm. of caustic soda, 115 gm. of water and 162 ml. of ethyl ether. After standing with occasional agitation for 13 days the ether layer was separated and the water layer diluted with an equal volume of ethyl alcohol. The sticky mass so obtained was placed in a desiccator where it hardened and was then crushed to a powder.

Sodium hypochlorite pentahydrate was dissolved in water to make a solution containing .31 gm. available chlorine per ml. 3.6 ml. of this solution were placed in a glass cup as in Example 1. 2.0 gm. of the polyimidometaphosphate salt were added. Then 3.7 ml. of a solution of acetic acid containing .30 gm. of acid per ml. were added dropwise. The solution was adjusted to a slight blue color when tested with thymol blue, the adjustment being made with 10% caustic soda solution. The product was precipitated with two volumes of dry ethyl alcohol. The product was placed in a desiccator and after 5 days weighed 1.2 gm. and contained 30.0% available chlorine.

*Example 5*

A solution of sodium hypochlorite was made up from the pentahydrate to contain 345 gm. of available chlorine per ml. 16.1 ml. of this solution were placed in a cup in an ice bath and 10 gm. of trisodium tri-imidometaphosphate containing 11.0% nitrogen were added gradually with stirring. Then 19.6 ml. of an acetic acid solution containing .285 gm. of acid per ml. were added slowly. 2.5 gm. of disodium hydrogen phosphate duodecahydrate were added and the solution evaporated to dryness under a pressure of 10 to 5 mm. A product containing 15.9% available chlorine was obtained. After drying in a desiccator over calcium chloride for 37 days this product contained 23.7% available chlorine.

*Example 6*

21.7 gm. of tetraphosphonitrilic chloride boiling between 155 and 215° C. at 10 mm. pressure were dissolved in 150 ml. of ethyl ether and placed in a 1000 ml. Erlenmeyer flask. 700 ml. of water were added. The mixture stood at room temperature for 5 days with occasional shaking. Then the ether layer was separated and the water layer containing finely divided, slightly soluble tetraimido phosphoric acids was filtered. The filter cake was washed once with ethyl alcohol and dried in the oven at 55° C. 12.9 gm. of acids were obtained containing 15.5% nitrogen.

A solution of sodium hypochlorite containing .268 gm. of available chlorine per ml. was made up by dissolving sodium hypochlorite pentahydrate in water. 14.6 ml. of this solution and 5 ml. of water were placed in a cup in ice water and 5.0 gm. of the tetraimidometaphosphoric acids prepared as above added gradually with stirring. The pH was adjusted to about 9 by first adding .5 ml. of 10% hydrochloric acid and then .1 gm. of trisodium phosphate. Then three volumes of ethyl alcohol were added and the solid filtered off and washed twice with ethyl alcohol. It was dried in vacuum at 60° C. to give 8.0 gm. of product containing 40.8% available chlorine.

*Example 7*

A solution of potassium hypochlorite was made by chlorinating a 43% solution of potassium hydroxide. The solution contained .221 gm. of available chlorine per ml. 17.7 ml. of this solution and 5 ml. of water were placed in a cup in ice water. 5.0 gm. of tetraimidometaphosphoric acid, prepared as in Example 6, were added gradually with stirring. The pH was adjusted to about 9 by adding 1.0 ml. of 10% hydrochloric acid and then .1 gm. of tripotassium phosphate. Three volumes of ethyl alcohol were added and after 15 minutes the solid formed was filtered off, washed with alcohol and dried at 60° C. in vacuum. The salt dried quickly. 10.0 gm. of product were obtained containing 33.0% available chlorine.

The product obtained by precipitation with alcohol was treated with enough water to make a thick slurry. This was filtered at 17° C. and washed with a small amount of water. A yield of the hexahydrate of tetrapotassium tetrachlorimidometaphosphate was obtained —$P_4N_4Cl_4K_4O_8.6H_2O$. These crystals commonly appear as flat plates, rhomboidal in shape having an acute angle of 70° which may be truncated. The extinction positions are coincidental with the diagonals of the rhombus. The hexahydrate of the tetrapotassium salt was dried at 60° C. and 2 mm. pressure to yield tetrapotassium tetrachlorimidometaphosphate having the following composition:

|  | Found | On Dry Basis | Theory for $P_4N_4Cl_4K_4O_8$ |
| --- | --- | --- | --- |
| Available chlorine | 45.8 | 46.1 | 46.8 |
| Active chlorine | 22.9 | 23.1 | 23.4 |
| Total chlorine | 23.0 | 23.2 | 23.4 |
| Nitrogen | 9.2 | 9.3 | 9.2 |
| Phosphorus | 20.3 | 20.4 | 20.4 |
| Water | 0.7 | 0.0 | 0.0 |

*Example 8*

60 gm. of phosphonitrilic chloride trimer, 183 gm. of potassium acetate, 161 gm. of water and 100 ml. of dioxane were placed in an Erlenmeyer flask provided with a reflux condenser. The mixture was heated slowly to boiling. In about ½ hour the second liquid phase had disappeared and hydrolysis was complete. The solution was concentrated under reduced pressure and a heavy slurry of tripotassium tri-imidometaphosphate and potassium chloride crystals was obtained. These crystals were filtered off and the potassium chloride separated by treating with water at 80 to 90° C. On cooling the filtrate from such a treatment potassium chloride crystals are obtained but no tri-imide. The potassium chloride is filtered off from the cooled solution and the filtrate used to again extract the crystal mixture. This operation is repeated until the crystal mixture is free of potassium chloride crystals. The product was found to contain 60.7% of the tri-imide and 6.2% of potassium chloride.

A solution of potassium hypochlorite was made by chlorinating potassium hydroxide solution until the solution contained .294 gm. of available chlorine per ml. after filtering off the potassium chloride crystals.

25 gm. of the tripotassium tri-imidometaphosphate as prepared above were added to 21.8 ml. of the potassium hypochlorite preparation in a vessel surrounded by an ice bath and provided with a stirrer. The amount of available chlorine used is sufficient to chlorinate two thirds of the nitrogen in the imide. 4 ml. of glacial acetic acid were added to bring the pH to about 9. 5 ml. of water were added. A slurry of needle-like crystals was obtained. This was filtered and the filter cake washed with alcohol. When dried at 50° C. in vacuum, a product was obtained containing 23% available chlorine.

The crystals as obtained above may be purified by dissolving in water to make a saturated solution at 40° C. and cooling to 4° C. to obtain a good yield of slender prisms having parallel extinction. They are a double compound of the partially chlorinated tri-imide and potassium chloride having the formula $$3P_3N_3Cl_2HK_3O_6.2KCl.10H_2O$$

These crystals commonly contain dipotassium hydrogen phosphate in the state of solid solution if this impurity should be present in the system. When the crystals are heated at 50° C. and 3 mm. pressure they lose only the uncombined water and produce a composition as follows:

|  | Found | Composition if no $K_2HPO_4$ were present | Theory for $3P_3N_3Cl_2HK_3O_6.2KCl.10H_2O$ |
| --- | --- | --- | --- |
| Available chlorine | 23.4 | 25.5 | 26.8 |
| Active chlorine | 11.7 | 12.7 | 13.4 |
| Total chlorine | 15.5 | 16.8 | 17.8 |
| Nitrogen | 7.2 | 7.9 | 7.9 |
| Phosphorus | 17.6 | 17.4 | 17.5 |
| Water | 12.3 | 13.4 | 11.3 |

The class of compounds described herein provide a new type of chlorine carrier providing a large and acceptable amount of chlorine of from 40% to 45%. The products are readily soluble in water and provide clear solutions not contaminated with the cloudy precipitates so characteristic of many of the compounds presently used to provide active chlorine.

The compounds are readily converted in alkaline solution to hypochlorite, which reaction is reversible; in preparation where hypochlorite is a reactant, the reversibility is depressed and very high conversion obtained. The products can, therefore, be associated with highly alkaline media as well as highly acid media.

The preferred mode of manufacture will dictate preparation of the polychlorimidometaphosphates in an environment where the pH is about 4 to 9 but they may be manufactured in very highly alkaline solutions even at pH 11 provided the reversible nature of the reaction is realized and excess hypochlorite provided. The reaction proceeds at very low pH and highly acidic media even of pH 1 do not appear to hinder the formation of the polychlorimidometaphosphoric acid compounds.

In general, the fully chlorinated products will be the desired end product where the compounds of the present invention are employed for their available chlorine. In such instances the tri-imido reactant produces a trichloroimidometaphosphate, the tetraimido, the tetrachloro compound, etc. The partially chlorinated compounds are producible by regulating the molar amounts of hypochlorite reacting upon the selected imidometaphosphate to produce a monochlor substituted, dichlor substituted or the like, depending upon the number of hydrogen present and the number to be replaced.

What is claimed is:

1. As a new class of compounds containing available chlorine the polychlorimidometaphosphates $$\left(PNH_{\frac{n-a}{n}}Cl_{\frac{a}{n}}MO_2\right)_n$$

where M is a metallic ion selected from the group consisting of the alkali metals and alkaline earth metals including magnesium and $n$ is an integer between 3 and 7 inclusive, and $a$ an integer from 1 to the value of $n$.

2. As a new compound containing available chlorine trisodium trichlorimidometaphosphate $P_3N_3Cl_3Na_3O_6$.

3. As a new compound containing available chlorine tripotassium dichlortriimidometaphosphate potassium chloride double salt $3P_3N_3Cl_2HK_3O_6 \cdot 2KCl \cdot 10H_2O$.

4. As a new compound containing available chlorine tetrasodium tetrachlorimidometaphosphate $$P_4N_4Cl_4Na_4O_8.$$

5. As a new compound containing available chlorine tetrapotassium tetrachlorimidometaphosphate $$P_4N_4Cl_4K_4O_8.$$

6. A process for producing a polychlorimidometaphosphate which comprises reacting a metal salt selected from the group consisting of the alkali metals and alkaline earth metals including magnesium of a polyimidometaphosphoric acid with sufficient of a water soluble metal hypochlorite to replace at least one hydrogen of the imidometaphosphate and recovering the chlorimidometaphosphate so formed.

7. A process for producing a polychlorimidometaphosphate which comprises reacting imidometaphosphoric acid with a water soluble metal hypochlorite within a pH range of pH 2 to pH 10 and recovering the chlorimidometaphosphate so formed.

8. A process for producing a polychlorimidometaphosphate which comprises reacting a metal salt selected from the group consisting of the alkali metals and alkaline earth metals including magnesium of a polyimidometaphosphoric acid with a water soluble metal hypochlorite within a pH range of pH 2 to pH 10 and recovering the reaction product by evaporating the reaction mass to dryness.

9. A process for producing a polychlorimidometaphosphate which comprises reacting a metal salt selected from the group consisting of the alkali metals and alkaline earth metals including magnesium of a polyimidometaphosphoric acid with a water soluble metal hypochlorite within a pH range of pH 2 to pH 10 and recovering the reaction product.

10. A process for producing a polychlorimidometaphosphate which comprises reacting imidometaphosphoric acid with a water soluble metal hypochlorite within a pH range of pH 2 to pH 10 and recovering the reaction product by evaporating the reaction mass to dryness.

11. A process for producing a polychlorimidometaphosphate which comprises reacting a metal salt selected from the group consisting of the alkali metals and alkaline earth metals including magnesium of a polyimidometaphosphoric acid with a water soluble metal hypochlorite within a pH range of pH 2 to pH 10, recovering the polychloroimidometaphosphate, suspending it in glacial acetic acid and subsequently removing said acid from the wanted product.

References Cited in the file of this patent

Hoffmann, "Dictionary of the Inorganic Compounds," published by Johann Ambrosius Barth, Leipzig, Germany, 1917, Band I, page 116.

Audrieth et al.: "Recent Developments in the Chemistry of Phosphorus," Journal of Chemical Education, February 1948, pages 85 and 86.